(12) United States Patent
Lecuivre

(10) Patent No.: US 12,124,304 B2
(45) Date of Patent: Oct. 22, 2024

(54) POWER MANAGEMENT OF A COMPUTING SYSTEM

(71) Applicant: Eaton Intelligent Power Limited, Dublin (IE)

(72) Inventor: Jerome Lecuivre, Isere (FR)

(73) Assignee: EATON INTELLIGENT POWER LIMITED, Dublin (IE)

( * ) Notice: Subject to any disclaimer, the term of this patent is extended or adjusted under 35 U.S.C. 154(b) by 84 days.

(21) Appl. No.: 17/757,410

(22) PCT Filed: Dec. 15, 2020

(86) PCT No.: PCT/EP2020/086296
§ 371 (c)(1),
(2) Date: Jun. 15, 2022

(87) PCT Pub. No.: WO2021/122652
PCT Pub. Date: Jun. 24, 2021

(65) Prior Publication Data
US 2023/0018342 A1    Jan. 19, 2023

(30) Foreign Application Priority Data
Dec. 20, 2019  (GB) ..................... 1919009

(51) Int. Cl.
*G06F 1/26* (2006.01)
*G06F 1/28* (2006.01)
(Continued)

(52) U.S. Cl.
CPC ............... *G06F 1/263* (2013.01); *G06F 1/28* (2013.01); *G06F 1/3203* (2013.01); *G06N 20/00* (2019.01)

(58) Field of Classification Search
CPC .......... G06F 1/263; G06F 1/28; G06F 1/3203; G06F 1/329; G06F 9/45558; G06F 2009/4557; G06N 20/00; Y02D 10/00
See application file for complete search history.

(56) References Cited

U.S. PATENT DOCUMENTS 10,824,215 B2 * 11/2020 Rong ..................... G06F 9/5094
11,003,478 B2 *  5/2021 Grehan ............... G06F 9/45558
(Continued)

FOREIGN PATENT DOCUMENTS

GB        2566680 A       3/2019
JP     2011160596 A  *  8/2011

OTHER PUBLICATIONS

Machine translation of the description of JP2011-160596A (Year: 2011).*

(Continued)

*Primary Examiner* — Glenn A. Auve
(74) *Attorney, Agent, or Firm* — LEYDIG, VOIT & MAYER, LTD.

(57) ABSTRACT

A method for power management of a computing system having two or more physical servers for hosting virtual machines of a virtual system and one or more uninterruptible power supplies for supplying at least a subset of the physical servers with power, each of the one or more uninterruptible power supplies being connected to a phase of a multiple phase power supply, is disclosed. The method comprises receiving an action input for the computing system, which may impact the power consumption of the physical servers, processing the received action input with a predictive model of power consumption of the physical servers with regard to the battery autonomy of the one or more uninterruptible power supplies and/or the load balancing of the several phases of the multiple phase power supply, and optimizing (Continued)

the utilization of the physical servers based on the result of the processing.

10 Claims, 14 Drawing Sheets

(51) Int. Cl.
    *G06F 1/3203*      (2019.01)
    *G06N 20/00*      (2019.01)

(56)              References Cited

U.S. PATENT DOCUMENTS

2016/0320818 A1*   11/2016   Huang .................. G06N 20/00
2019/0235449 A1     8/2019   Slessman et al.
2021/0021126 A1*    1/2021   Hall ....................... G06F 1/263

OTHER PUBLICATIONS

Khanna et al., "Phase-Aware Predictive Thermal Modeling for Proactive Load Balancing of Compute Clusters", IEEE Xplore <URL: https://ieeexplore.ieee.org/stamp/stamp.jsp?arnumber=6471016>; International Conference on Energy Aware Computing, 2012. (Year: 2012).*

* cited by examiner

| Layer | Action name | IT Connector | Impact | | | | |
|---|---|---|---|---|---|---|---|
| | | | Server | Storage | Network | Rack | Single Datacenter |
| Cloud Orchestrateur | Optimization / new placement | Cloud orchestrator scheduler (Openstack) | o | o | o | x | x |
| Virtualisation Management (including openstack virtualization management) | Remote site migration | Vmware SRM / ... | o | o | o | o | x |
| | Server Maintenance modes | vCenter/ Xen / Microsoft Hyper-V / Nova | x | o | o | o | o |
| | VM move | vCenter/ Xen / Microsoft Hyper-V / Nova | x | o | o | o | o |
| | Virtual storage management | Openstack Cinder (Migrate Volumes) | - | x | o | o | o |
| | VM load shedding | vCenter/ Xen / Nova / Microsoft Hyper-V | x | o | o | o | o |
| Native Operating System or Virtualisation (Host + VM) | Gracefull shutdown | Shutdown agent (Windows, Linux, Unix, Vmware, Xen, KVM, ...) | x | o | o | o | o |
| | | Netapp connector | - | x | o | o | o |
| | | serveur remote agentless through vCenter/ Xencenter / | x | o | o | o | o |
| | | Remote agentless ssh command (Linux, Unix, storage ) | x | x | o | o | o |
| Physical Infrastructure | Power Capping | HP Oneview & HP ILO / ... | x | o | o | o | o |
| | Power off | ePDU off command / UPS Off command / ... | x | x | x | x | o |

| | |
|---|---|
| x | Main Impact |
| o | Secondary Impact |
| - | No impact |

Fig. 2

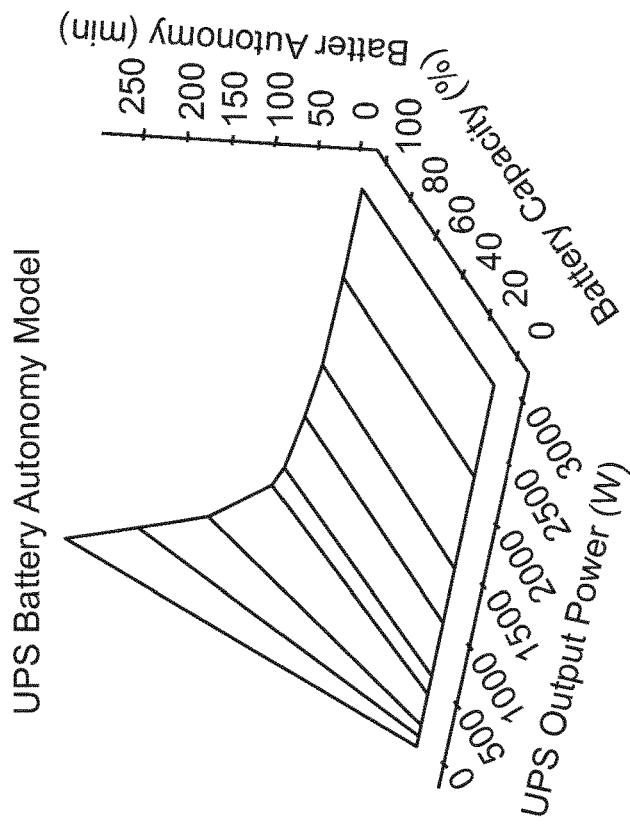
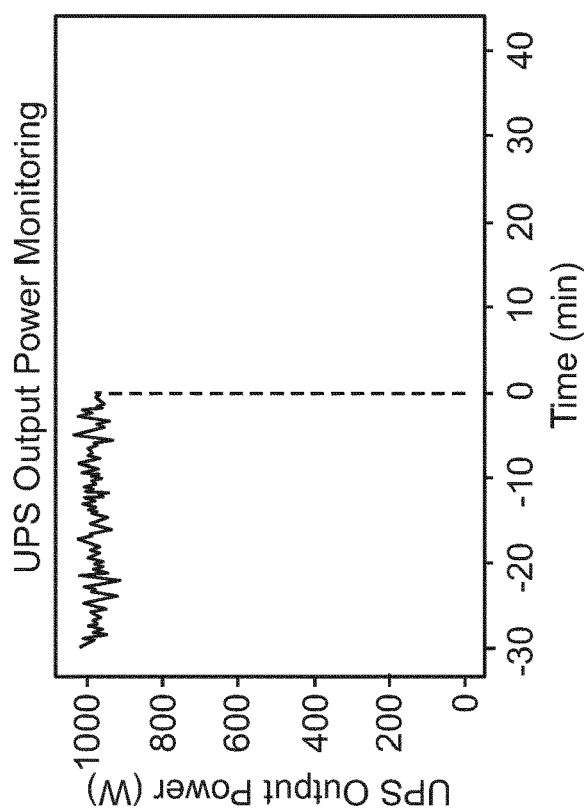
Fig. 6

POWER MANAGEMENT OF A COMPUTING SYSTEM

TECHNICAL FIELD

This specification relates to power management of a computing system, which may be employed in a datacenter, and the specification particularly relates to managing actions on the computing system particularly to be performed in reaction to power events or in reaction to grid instability particularly through a "demand response" mechanism. Particularly, the specification provides a way to predict the impact of these actions on the power consumption of a computing system.

BACKGROUND

A typical datacenter comprises a building or a group of buildings with one or more rooms. Each room in such a datacenter typically contains one or more rows, in which one or more racks can be arranged, which contain IT (Information Technology) system equipment such as physical servers (PSs) or server computers. The IT system equipment is usually powered by power equipment like (but not limited to) electronic Power Distribution Units (ePDUs) or Uninterruptible Power Supplies (UPSs) or a combination of them.

An example of a computing system is a virtual system comprising several virtual machines (VMs) hosted by two or more PSs. Such a virtual system may be for example applied in a datacenter with PSs hosting the VMs. These PSs are also called virtualization hosts.

Optimization of the power consumption in computing systems particularly applied in datacenters is nowadays an important topic. For example, the software VMware DPM (Distributed Power Management) from VMware, Inc. is a solution for power consumption optimization for virtual systems. The optimization mechanism applied by VMware DPM concentrates the VM placement on a reduced set of PSs particularly by migrating VMs on fewer virtualization hosts and shuts down the no longer required PSs.

Eaton offers an Intelligent Power Manager (IPM) software for monitoring and managing physical power devices (UPSs, ePDUs, etc) or PSs or virtual environments (Hypervisor, VMs, etc). The IPM software particularly allows to remotely monitor, manage and control UPSs and other devices in a datacenter, and allows a VM move or graceful shutdown in the event of an extended shutdown.

SUMMARY

This specification describes a method and a system for power management of a computing system, which may be employed in a datacenter.

According to an aspect of this specification, a method for power management of a computing system, which comprises two or more physical servers for hosting virtual machines of a virtual system and one or more uninterruptible power supplies for supplying at least a subset of the physical servers with power, each of the one or more uninterruptible power supplies being connected to a phase of a multiple phase power supply, is disclosed. The method comprises receiving an action input for the computing system, which may impact the power consumption of the physical servers, processing the received action input with a predictive model of power consumption of the physical servers with regard to the battery autonomy, which particularly corresponds to the time of power supply a battery can deliver to a specific load, of the one or more uninterruptible power supplies and/or the load balancing of the several phases of the multiple phase power supply, and optimizing the utilization of the physical servers based on the result of the processing.

The method may comprise receiving measurements related to the operation of the physical servers, using a machine learning algorithm for learning the power consumption of one or more individual parts of the computing system depending on actions and the measurements, and generating and/or improving the predictive model of power consumption of the physical servers based on the output of machine learning algorithm and the measurements.

The measurements related to the operation of the physical servers may comprise at least one of the following: total power consumption of the computing system; temperature of the environment of the computing system; virtual machines activity; power consumption of single physical servers; the processor activity of single physical servers; the mapping of virtual machines on the physical servers.

The machine learning algorithm may receive a training data set based on the received measurements and a validation data set based on the received measurements and processes the training data set and the validation data set to generate the predictive model.

The optimizing of the utilization of the physical servers based on the result of the processing may comprise receiving optimization constraints and optimization actions of the computing system, determining one or more actions from the optimization actions for fulfilling the optimization constraints, and using the determined one or more actions for the power management of the computing system.

The determining of one or more actions from the optimization actions for fulfilling the optimization constraints may comprise determining a sequence of shutdown actions and/or shifting actions of virtual machines and/or physical servers depending on the remaining battery autonomy of the one or more uninterruptible power supplies and/or depending on the load balancing of the several phases of the multiple phase power supply. Shutdown actions of virtual machines may comprise terminating the operation of virtual machines, and shifting actions of virtual machines may comprise moving virtual machines from one physical server to another physical server, which may be done for example before shutting a physical server, on which no longer any virtual machine is executed.

According to a further aspect of this specification, a system for power management of a computing system, which comprises two or more physical servers for hosting virtual machines of a virtual system and one or more uninterruptible power supplies for supplying at least a subset of the physical servers with power, each of the one or more uninterruptible power supplies being connected to a phase of a multiple phase power supply, is disclosed. The power management system comprises a predictive model of power consumption of the physical servers, the predictive model being provided to receive an action input for the computing system, which may impact the power consumption of the physical servers, and to process the received action input with regard to the battery autonomy of the one or more uninterruptible power supplies and/or the load balancing of the several phases of the multiple phase power supply, and an optimizer being provided for optimizing the utilization of the physical servers based on the result of the processing by the predictive model.

The optimizer may be provided to receive optimization constraints and optimization actions of the computing system, determine one or more actions from the optimization actions for fulfilling the optimization constraints, and use the determined one or more actions for the power management of the computing system.

The optimizer may be provided to determine one or more actions from the optimization actions for fulfilling the optimization constraints by determining a sequence of shutdown actions of virtual machines and/or physical servers depending on the remaining battery autonomy of the one or more uninterruptible power supplies and/or depending on the load balancing of the several phases of the multiple phase power supply.

A yet further aspect of this specification relates to a non-transitory computer-readable storage device storing software comprising instructions executable by a processor of a computing device which, upon such execution, cause the computing device to perform the method disclosed in this specification.

The details of one or more embodiments are set forth in the accompanying drawings and the description below. Other features and advantages will be apparent from the description and drawings, and from the claims.

DESCRIPTION OF DRAWINGS

FIG. 2 shows a table listing different IT actions and their impact on different IT system equipment;

FIG. 6 shows an example of an UPS battery autonomy model;

DETAILED DESCRIPTION

Figure 1:
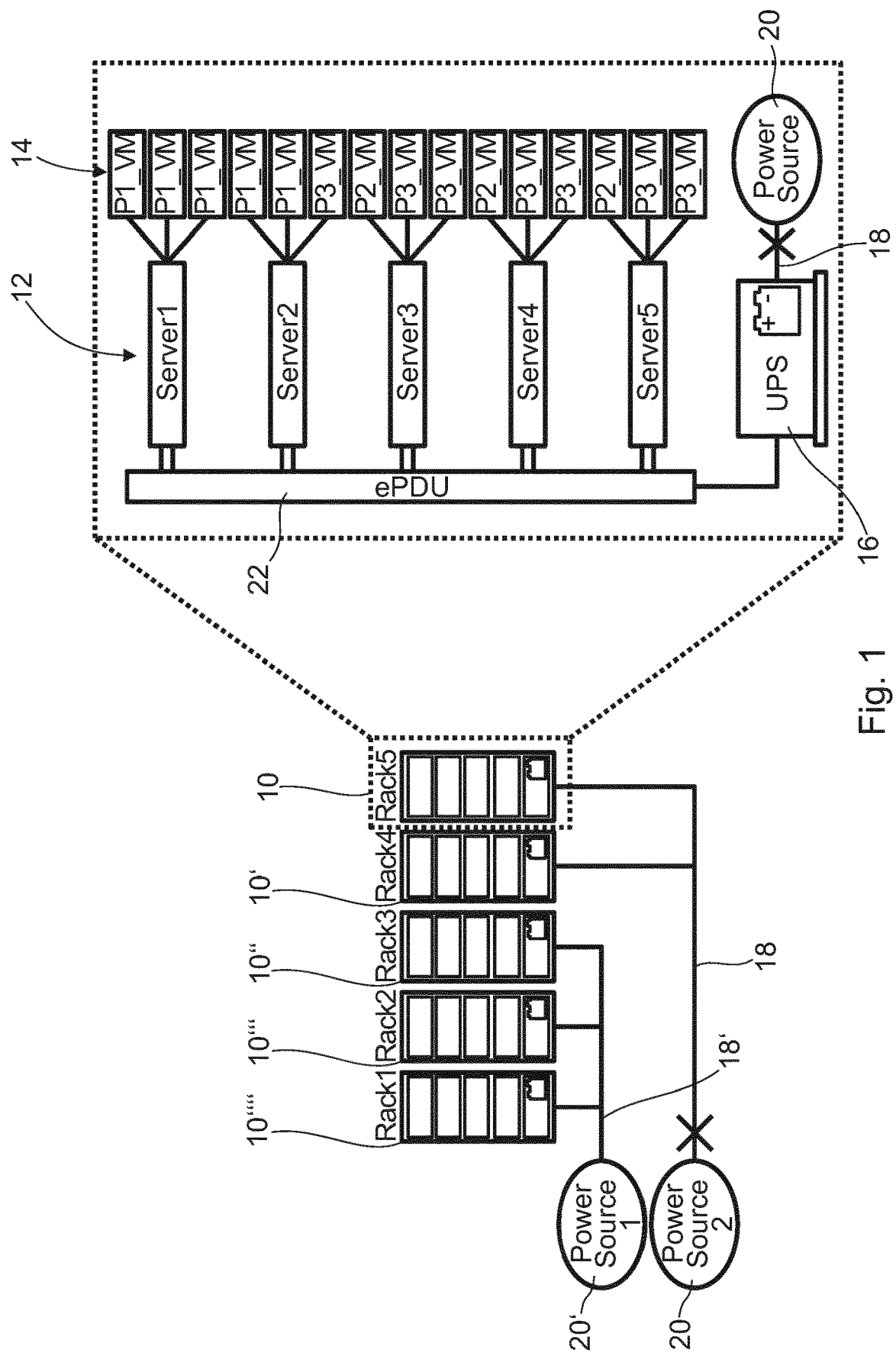
FIG. 1 shows an example of several computing systems comprising physical servers hosting virtual machines of one or more virtual systems.

In the following, functionally similar or identical elements may have the same reference numerals. Absolute values are shown below by way of example only and should not be construed as limiting.

The term "virtual machine"—VM—used herein describes an emulation of a particular computer system. A VM is in the context of the present invention a special case of computer program with an operating system. The solution also applies to "light weight" VMs also called "containers". The term "physical server"—PS—used herein describes an entity comprising a physical computer. A PS may comprise a hypervisor software, which configures the physical computer to host one or more virtual machines. The PS is in the context of the present invention a special case of computing device. The term "virtual system" used herein designates a system comprising two or more PSs, each hosting at least one VM, and wherein at least two of the PSs are supplied by different single phase electrical lines split off from of a multi-phase power input line. The term "computing system" as used herein generally describes a system comprising software and hardware as for example employed in a datacenter. The virtual system is in the context of the present invention a special case of computing system. A computing system may comprise one or more virtual systems.

For a datacenter, establishing a proper business continuity plan for managing power loss is key to avoid critical data loss. Through the software IPM (Intelligent Power Manager), some actions on the IT system equipment of a datacenter can be predefined and automated as soon as a power failure is detected. When IT actions such as a VM move, a VM shutdown, a VM placement, a PS shutdown, a VM start, a PS start up or booting, a NAS (Network Attached Storage) startup or booting etc., are configured with the IPM software, the power impact of these actions is not known. It is also impossible to predict in advance if the IT actions on non-critical loads will sufficiently and significantly increase UPS autonomy to keep alive critical VMs during an expected time frame. An IT action sequence configured with the IPM software is predefined and static.

So-called "Green" IT mechanisms such as the above-mentioned Distributed Power Management (DPM) software are currently proposed to optimize datacenter power consumption during datacenter normal operation. These mechanisms are often based on following scenario: concentrate the VM placement on a reduced set of servers and shutdown the non-necessary servers. However, such mechanisms are not used during a power crisis context (a business continuity plan executed during an UPS autonomy) or are used regardless of datacenter multiple phase, particularly 3-phase balance criteria, and/or are not used to participate to Grid stability through energy demand response mechanism. Consequently, a server shutdown initiated by "green" IT mechanisms can thus degrade the phase balance of the mains power supply in a datacenter and can also have a negative impact on power consumption.

The methods and systems described in this disclosure intend to predict and quantify how much each individual IT action such as a VM move, a VM shutdown, a VM placement, a PS shutdown, a VM start, a PS start up or booting, etc., will impact, particularly decrease IT load consumption. The prediction as described herein may be applied particularly to the following use cases:
 a UPS autonomy sequence;
 a multi-phase, particularly a 3-phase load balancing.
 an energy demand response mechanism to contribute to stabilize the power grid when needed.
The prediction may be based on:
 IT and power data acquisition (VM resource consumption, PS consumption, ... )
 an artificial Intelligence (AI) model for a power consumption prediction.
With the prediction, a load shedding sequence may be dynamically scheduled particularly due to an AI algorithm to optimize runtime for critical VMs.

The methods and systems described in this disclosure may collect one or more datasets from existing assets, particularly UPSs, ePDUs, PSs, VMs, and use AI/ML (Machine Learning) techniques to continuously control and particularly optimize the utilization of IT system equipment or IT resources, which is for example employed in a datacenter.

The methods and systems described in this disclosure may allow to reduce energy-related costs of IT system equipment particularly of a datacenter and may provide "augmented intelligence" to human operators in case of a power crisis.

FIG. 1 shows an example of a datacenter with several computing systems 10 to 10'''', each comprising several PSs and one or more UPSs housed in a rack. The UPS of each computing system 10 to 10'''' is supplied by single phase 18, 18' of a multiple phase power supply 20, 20'.

Computing system 10 is shown in more detail in FIG. 4: five PSs 12, designated as Server1-Server5 are contained in a single rack and supplied with electrical power from a ePDU 22, which is electrically connected to the power output of an UPS 16, the power input connector of which is connected to a phase 18 of a power source or power supply 20. The power supply 20 may be for example a single phase split off from a multiple phase, particularly a 3-phase power supply such as the mains. Each PS 12 hosts one or more VMs 14 of a virtual system.

In FIG. 1, the power supply via phase 18 is interrupted (power failure) so that the UPS 16 must autonomously supply the PSs 12 via the ePDU 22 in order to ensure business continuity. In case of such power crisis event, a software executed by one or more of the computing systems 10 to 10'''' or another IT system equipment such as an external computer may control IT actions to be performed such that the requirements for business continuity in view of UPS autonomy may be achieved.

FIG. 2 shows a table containing different IT actions particularly being implemented in the IPM software suite and their impact on different IT system equipment such as server, storage, network, rack, and single datacenter. The actions comprise actions on the cloud orchestrator layer, the virtual management layer, the native operating system or virtualization (host+VM) layer, and the physical infrastructure layer such as optimization/new placement, remote site migration, server maintenance modes, VM mode, virtual storage management, VM load shedding, a graceful shutdown, a power capping, and power off. The table lists also the respective IT connector. An "IT connector" is a connection from the IPM software suite to an "IT platform" (e.g. : Virtualization manager, Virtualization Host, Network Attached Storage, . . . ). When the IPM software sends a remote command (with right credential) to the "IT platform" then the "IT platform" performs the "IT action". An example is described in the following: step 1) from the IPM software, a user configures an "IT connector" to "vCenter" with the right parameters (credential; port; vCenter IP address, . . . ); step 2) then the IPM software retrieves from vCenter the list of VMs managed by vCenter; step 3) a user can configure a sequence of IT actions on these VMs; step 4) when needed, the IPM software can trigger this sequence of IT actions for example a "VM move" action on these VMs through vCenter. Thus, an "IT connector" is a kind of "Access point" for the IPM software to the various "IT platforms" (Windows Hyper-V, VMware,). As the IPM software can connect to various "Layers" of the IT architecture then the IPM software provides different types of "IT actions" that are listed in FIG. 2. The impact of each action is classified as main impact, secondary impact, and no impact.

Figure 3:
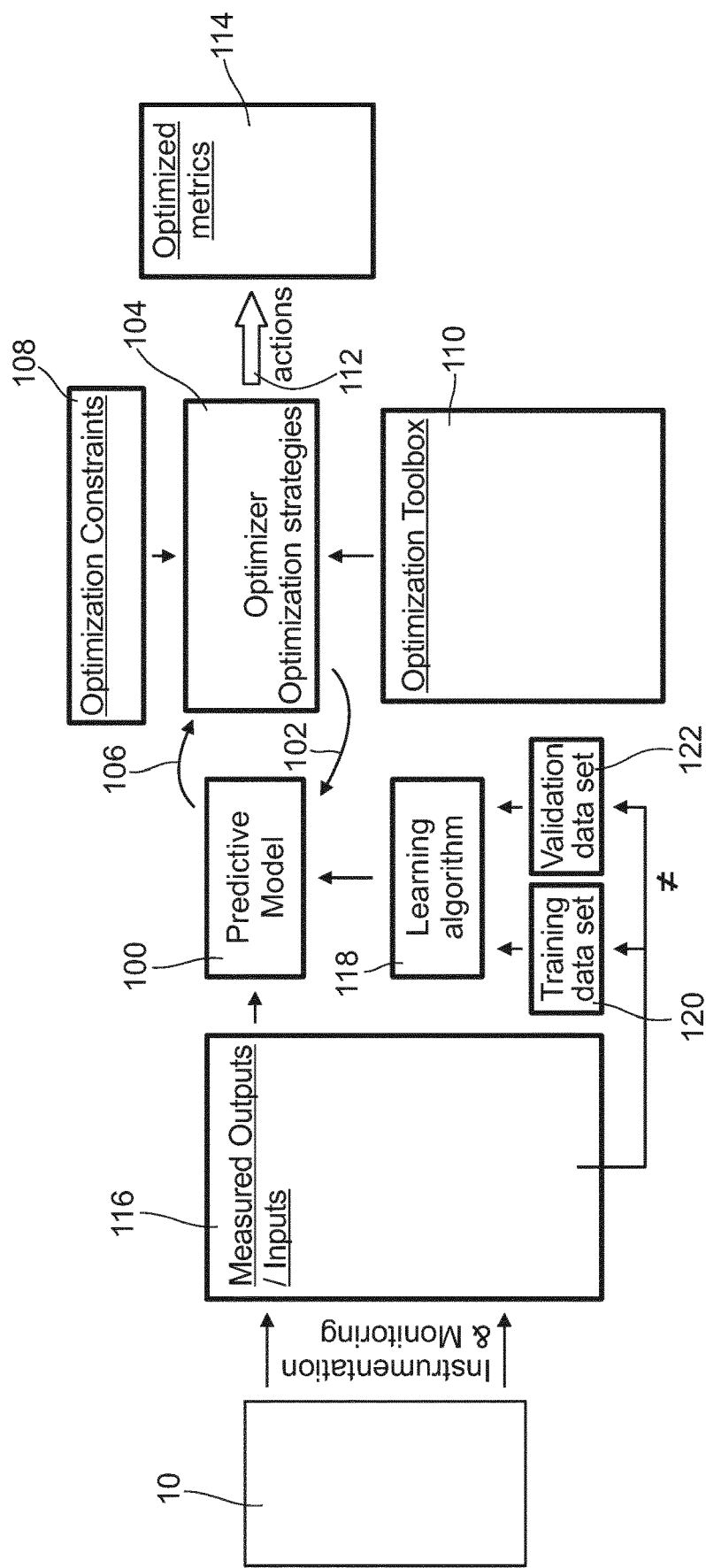
FIG. 3 shows an example a system for power management of a computing system as employed in the datacenter of FIG. 1.

FIG. 3 shows an example of a system for power management of a computing system as employed in the datacenter of FIG. 1. The core of the shown system is a predictive model 100 of power consumption of the PSs 12 regarding the battery autonomy of the one or more uninterruptible power supplies and/or the load balancing of the several phases of the multiple phase power supply. The predictive model 100 is provided to receive an action input 102 (see actions, FIG. 2) for the computing system 10, which may impact the power consumption of the PSs 12, and to process the received action input 102 regarding the battery autonomy of the UPS 16 and/or the load balancing of the several phases of the multiple phase power supply 20.

The predictive model 100 is generated based on the output of an AI/machine learning (ML) algorithm 118 and measurements 116 related to the operation of the PSs 12 of the computing system 10. The measurements 116 may comprise measured outputs or inputs such as the total power consumption (kW), the temperature of the environment of the computing system 10 such as the temperature of the room, in which the computing system 10 is operated, the VM activity on the computing system 10, the power consumption of one or more PSs of the computing system 10, the CPU activity of one or more PSs of the computing system 19, the VM mapping on the PSs of the computing system, etc.

From the measurements 116, a training data set 120 and a validation data set 122 are created, which are forwarded to the IA/machine learning algorithm 118 for processing to generate the predictive model 100.

An optimizer 104 is provided for optimizing the utilization of the PSs 12 based on the result 106 of the processing of by the predictive model 100. The optimizer 104 may be provided to receive optimization constraints 108, for example according to a Service Level Agreement (SLA) requiring a specific or minimum level of Qualtiy of Service (QoS), and optimization actions 110, for example a workload consolidation (VM migration/shutdown), an idle server shutdown, energy-aware scheduling policies, power capping/DVFS, etc., of the computing system 10, determine one or more actions 112 from the optimization actions for fulfilling the optimization constraints, and use the determined one or more actions for the power management 114 of the computing system 10, particularly for obtaining an optimized metrics such as the total energy consumption, ITEU (IT equipment utilization), PUE (Power Usage Effectiveness), QoS, etc.

In the following, it is described by means of an example how an accurate prediction of the UPS autonomy during an IT safeguard policy (an IPM2 automation plan), which is triggered in case of a power outage, may be processed.

A system-specific machine learning algorithm, which is based on an estimation of the power saving of IT actions in a virtual system, particularly a virtualized datacenter, is provided. These power saving estimations may then be injected into an existing hard coded experimental UPS autonomy model to estimate the impact of these actions on the UPS autonomy before a power crisis happens.

An example of IT actions with their expected power benefits and the respective UPS autonomy increase is listed in the followings:

1. IT action: shutdown 10 "priority 3" VMs; expected power benefit: 0.7 kW; UPS autonomy increase: 2 minutes.
2. IT action: shutdown 2 "priority 2" hypervisors; expected power benefit: 1.3 kW; UPS autonomy increase: 3 minutes.
3. IT action: run consolidation algorithm (new energy aware VM placement); expected power benefit: 2 kW; UPS autonomy increase 6 minutes.
4. Shutdown 6 outlets on a ePDU; expected power benefit: 1 kW; UPS autonomy increase: 2 minutes.

FIGS. 4A-4D show an example computing system with PSs 12, VMs 14 hosted by the PSs 12, an UPS 16 connected to a single phase power supply 20, and an electronically controllable ePDU 22, which provides a power supply from the power outlet of the UPS 16 to the single PSs 12, during different phases of automation plan of an IT safeguard policy, which may be launched due to a power outage, caused by an interruption of the power supply of the UPS 16 from the single phase power supply 20.

The automation plan is described here as another illustrative example and comprises the following steps:
1. Wait for the UPS battery capacity falling below 75%.
2. IT action: power off 7 VMs.
3. Wait for the UPS battery capacity falling below 50%.
4. IT action: graceful shutdown of 2 VMs and 2 PSs.
5. Wait for the UPS battery capacity falling below 25%.
6. IT action: graceful shutdown of 1 VM and 1 PS.

Figure 5A:
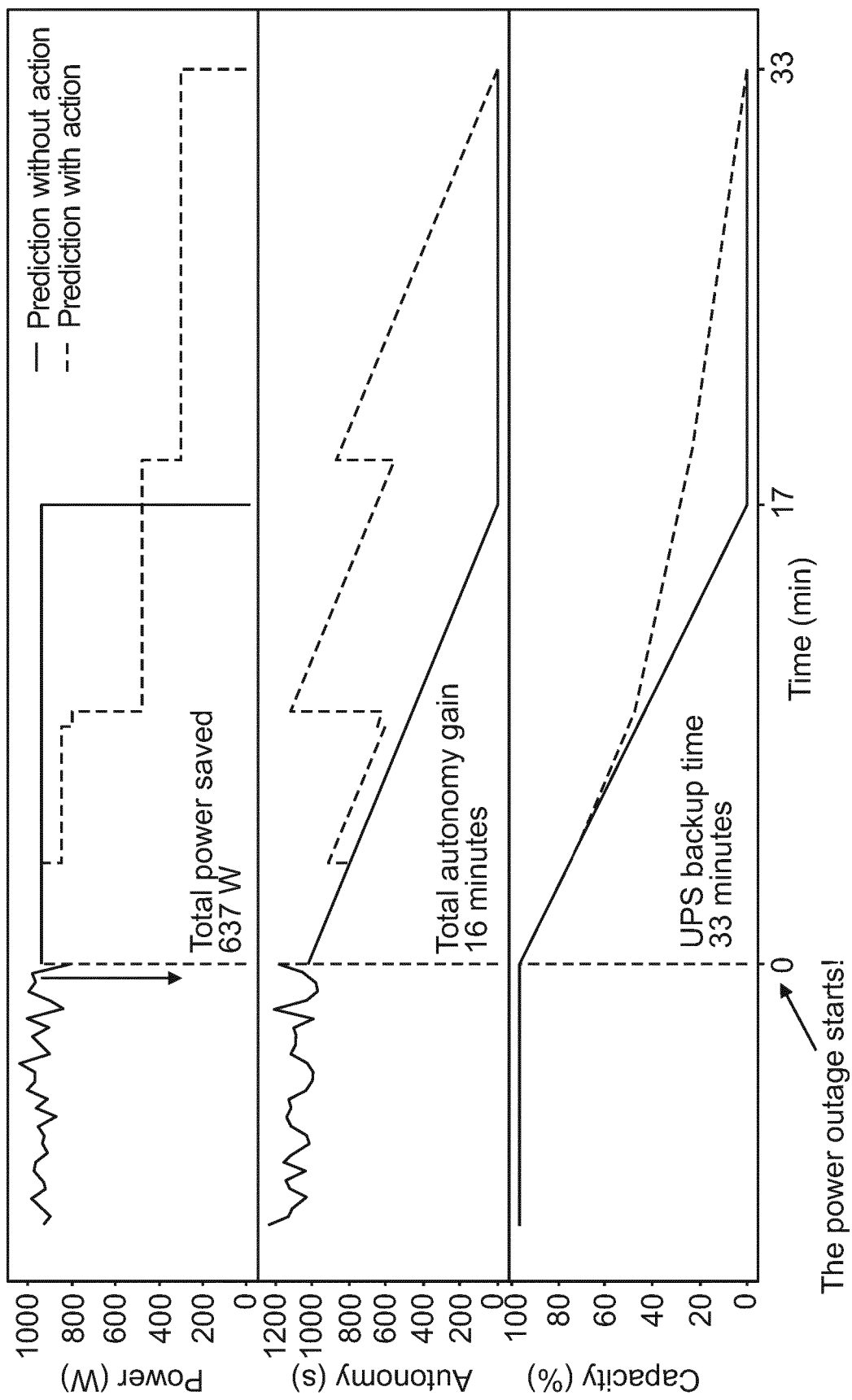
FIGS. 5A and 5B show exemplary diagrams with the power, UPS autonomy and capacity over the time after the power outage starts and the impact of actions according to an automation plan, wherein FIG. 5B also illustrates how accurate the prediction model is compared to a real experience with real measures.

FIG. 5A shows a diagram with the power, UPS autonomy and capacity over the time after the power outage starts and the impact of the above listed actions.

Figure 4A:
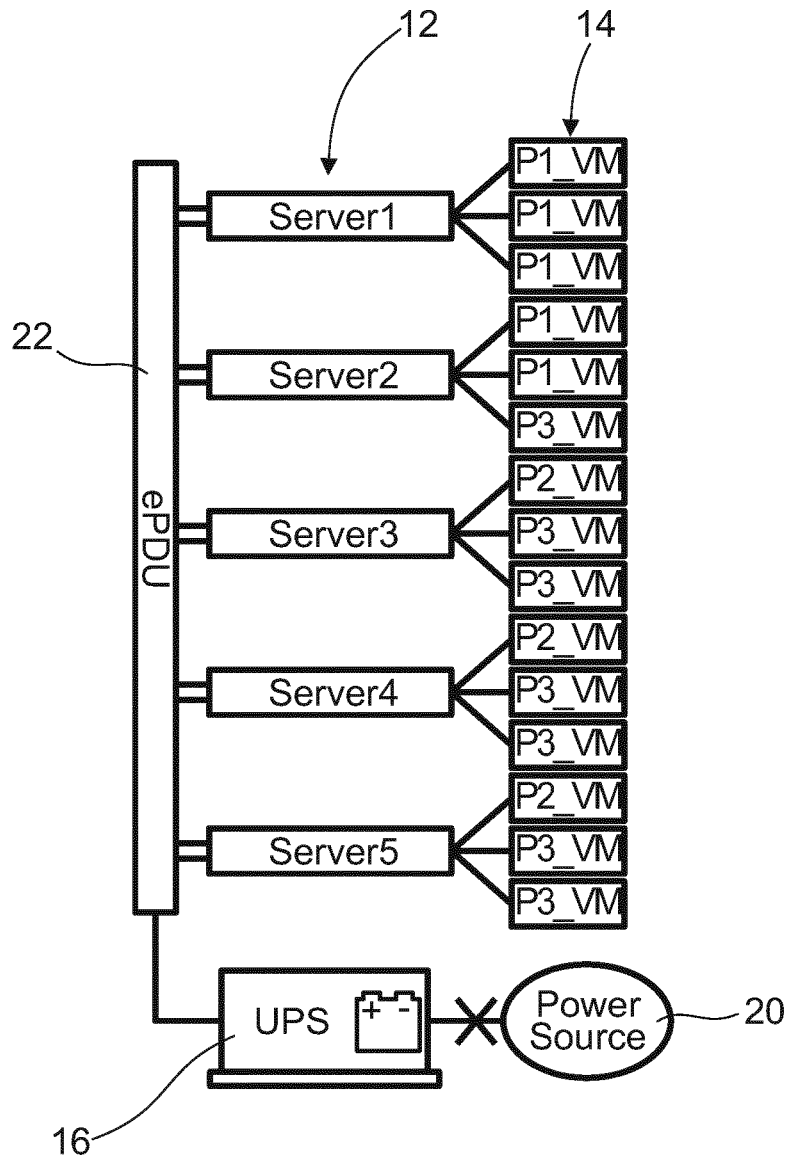
FIGS. 4A-4D show an example computing system with PSs, VMs hosted by the PSs, an UPS connected to a single phase power supply, and an electronically controllable ePDU, which provides a power supply from the power outlet of the UPS to the single PSs, during different phases of automation plan of an IT safeguard policy, launched due to a power outage.

In FIG. 4A, the computing system is operated after the power outage occurred without performing an IT action of the automation plan. As can be seen in the "no actions" curve in FIG. 5A, the power load remains unchanged, and the UPS autonomy steadily decrease as well as its capacity.

Figure 4B:
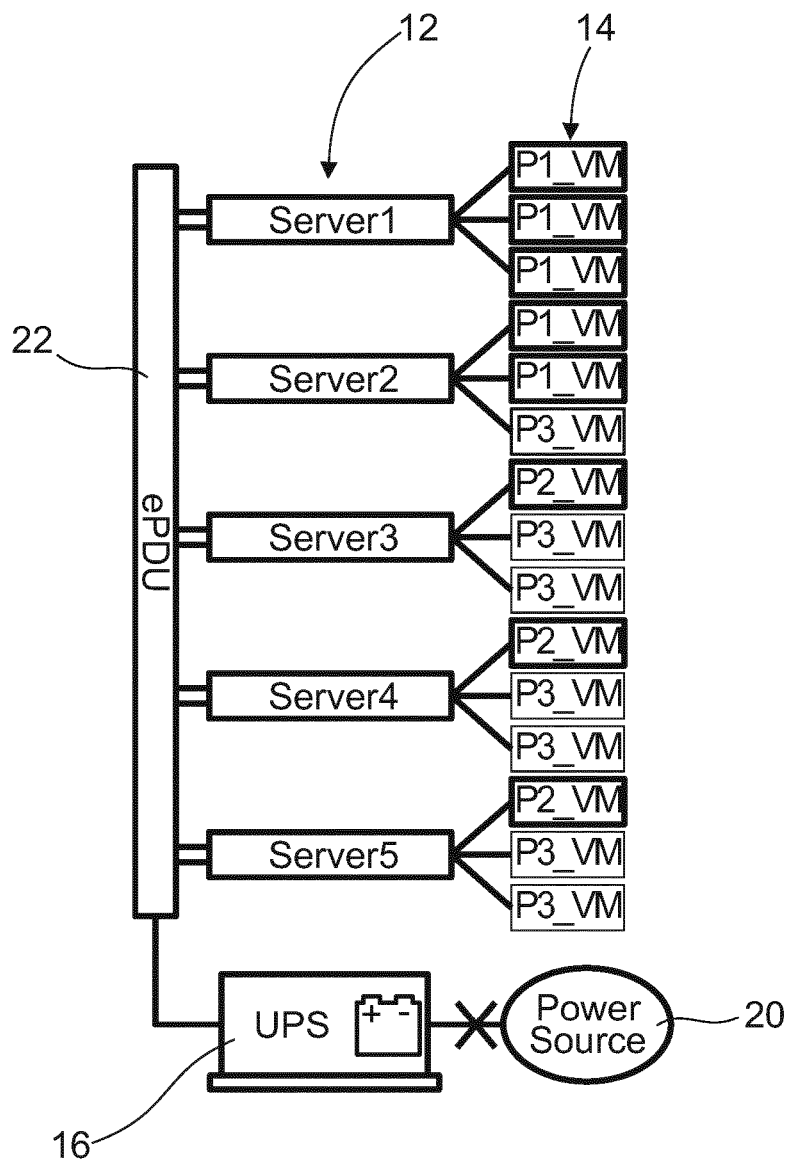

In FIG. 4B, when the UPS battery capacity has fallen below 75%, the first action of the automation plan is performed, which shuts down 7 "priority 3" VMs (P3_VM). FIG. 5A predicts that due to this first action, the power load will reduce, and the UPS autonomy as well as the UPS capacity will increase.

Figure 4C:
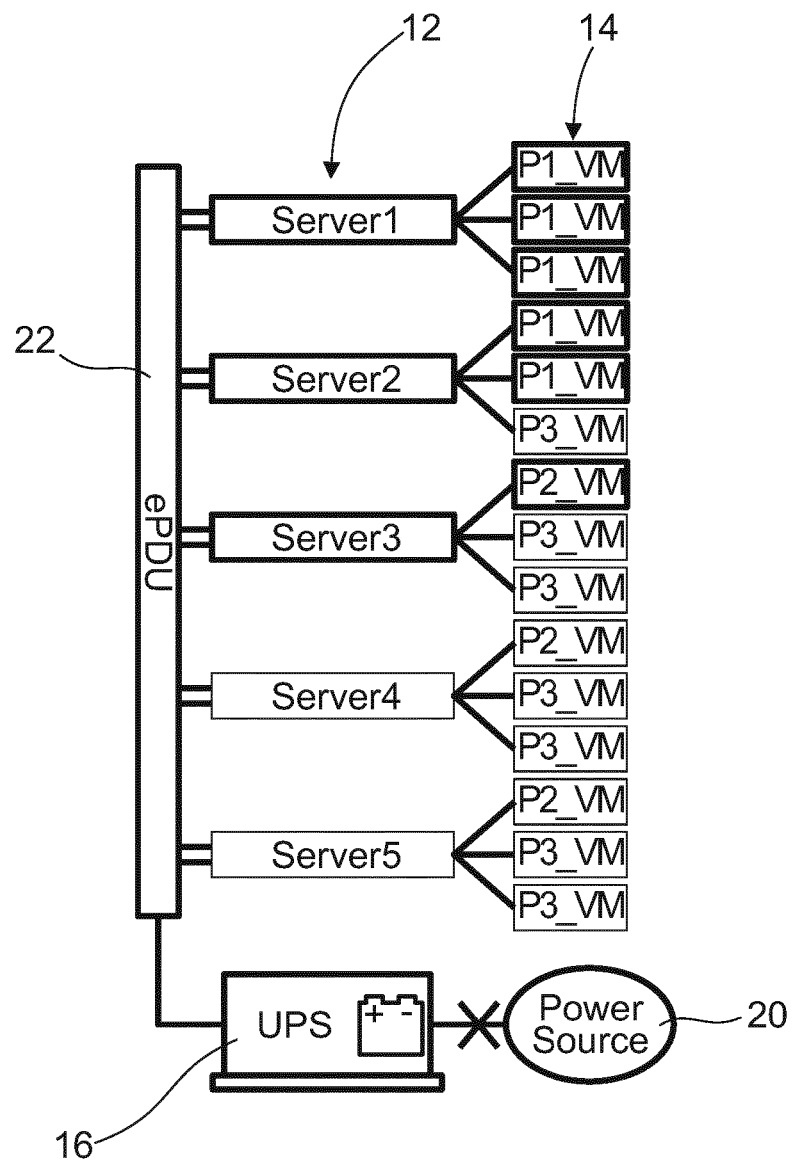

In FIG. 4C, when the UPS battery capacity has fallen below 50%, the second action of the automation plan is performed, which shuts down 2 "priority 2" VMs (P2_VM) and 2 PSs (Server4 and Server5). FIG. 5A predicts that due to this second action, the power load will reduce more than after the first action, and the UPS autonomy as well as the UPS capacity will increase.

Figure 4D:
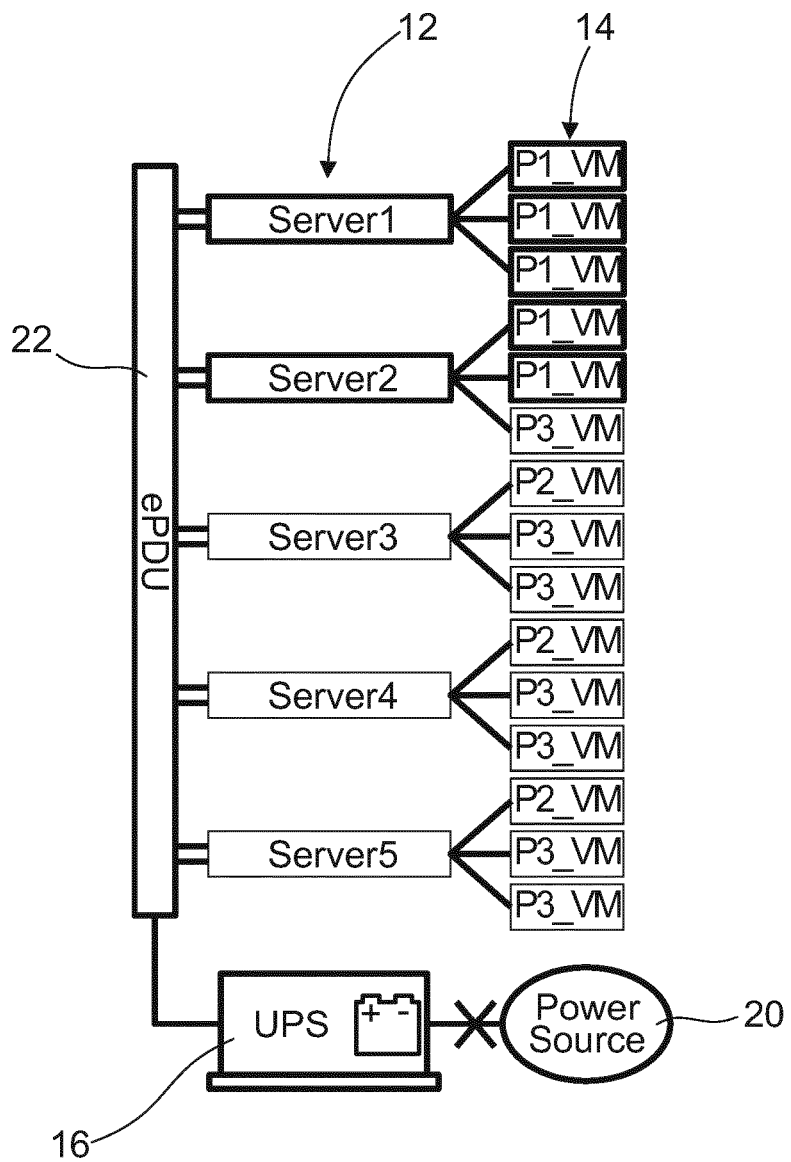

In FIG. 4D, when the UPS battery capacity has fallen below 25%, the third action of the automation plan is performed, which shuts down 1 "priority 2" VM (P2_VM) and 1 PS (Server3). FIG. 5A predicts that due to this action, the power load will again be reduced more than after the first action, but less than the second action, and the UPS autonomy as well as the UPS capacity will increase.

With the above described automation plan, the operation of the "priority 1" VMs and the PSs "Server1" and "Server2", which host the "priority 1" "VMs", is extended if possible, as can be seen in FIG. 5A, where the UPS autonomy and capacity is increased with the automation plan compared to an operation of the UPS with no actions, where during 17 minutes after the power failure the computing system is operated without any changes so that the power load does not change and after 17 minutes the UPS autonomy ends at a capacity of 0.

Figure 5B:
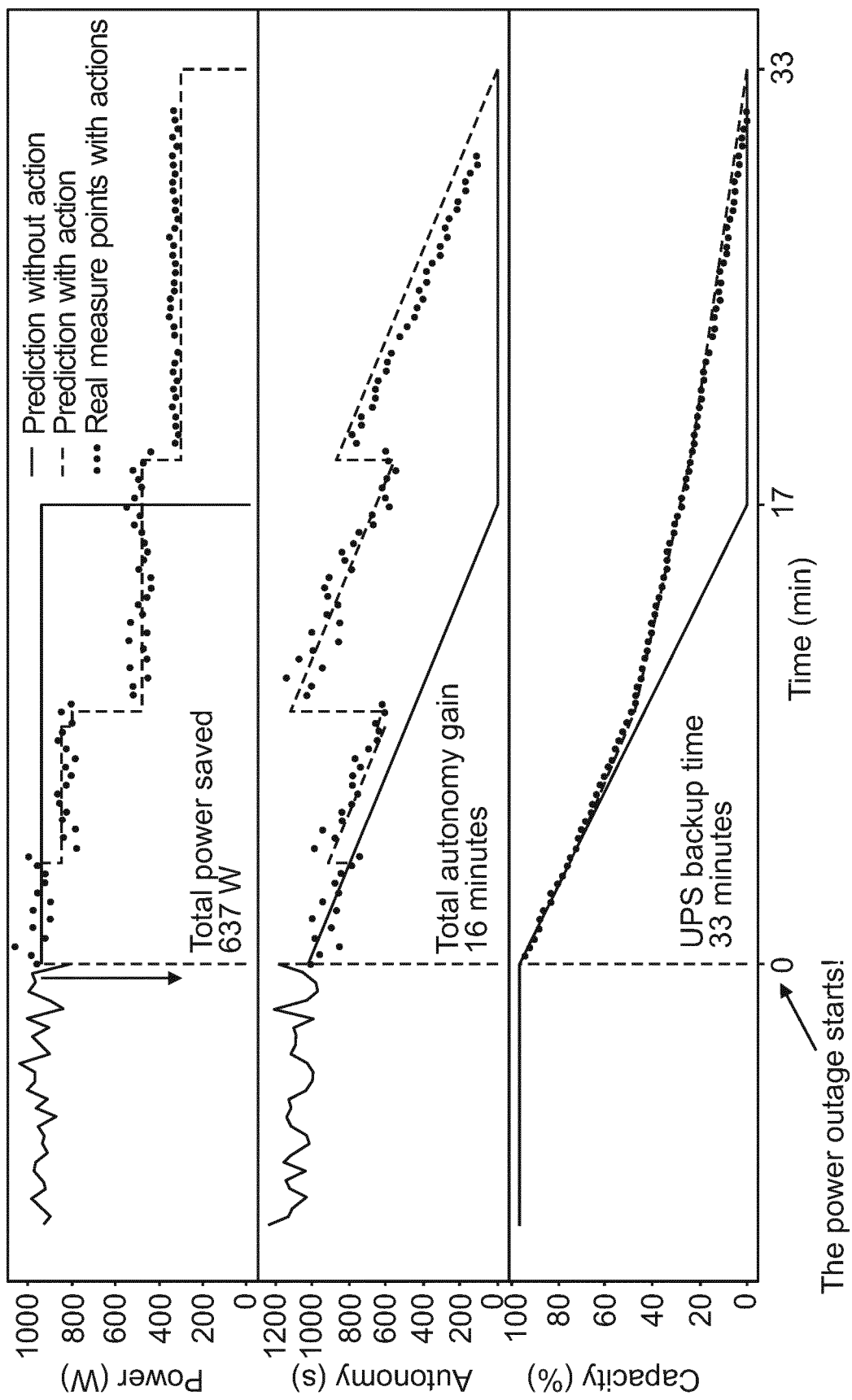

FIG. 5B compares the real-time behavior (dotted lines in the diagrams) of the UPS to the predicted behavior (dashed lines in the diagrams) as shown in FIG. 5A. The real-time behavior essentially corresponds to the predicted behavior. Real time behavior (dotted lines) is initiated by a real physical event (UPS input power source failure). A preconfigured automation plan is then executed from an IPM SW triggering actions on the real system comprising: PS, ePDU, VM, UPS, . . . To allow comparison between "real experience" and "prediction", the preconfigured "real experience" automation plan has same parameters and action triggers as the predicted automation plan. This 5B figure illustrates how accurate the prediction model is when compared under the same conditions to a real experimentation with real measures acquired from a physical system.

Figure 7:
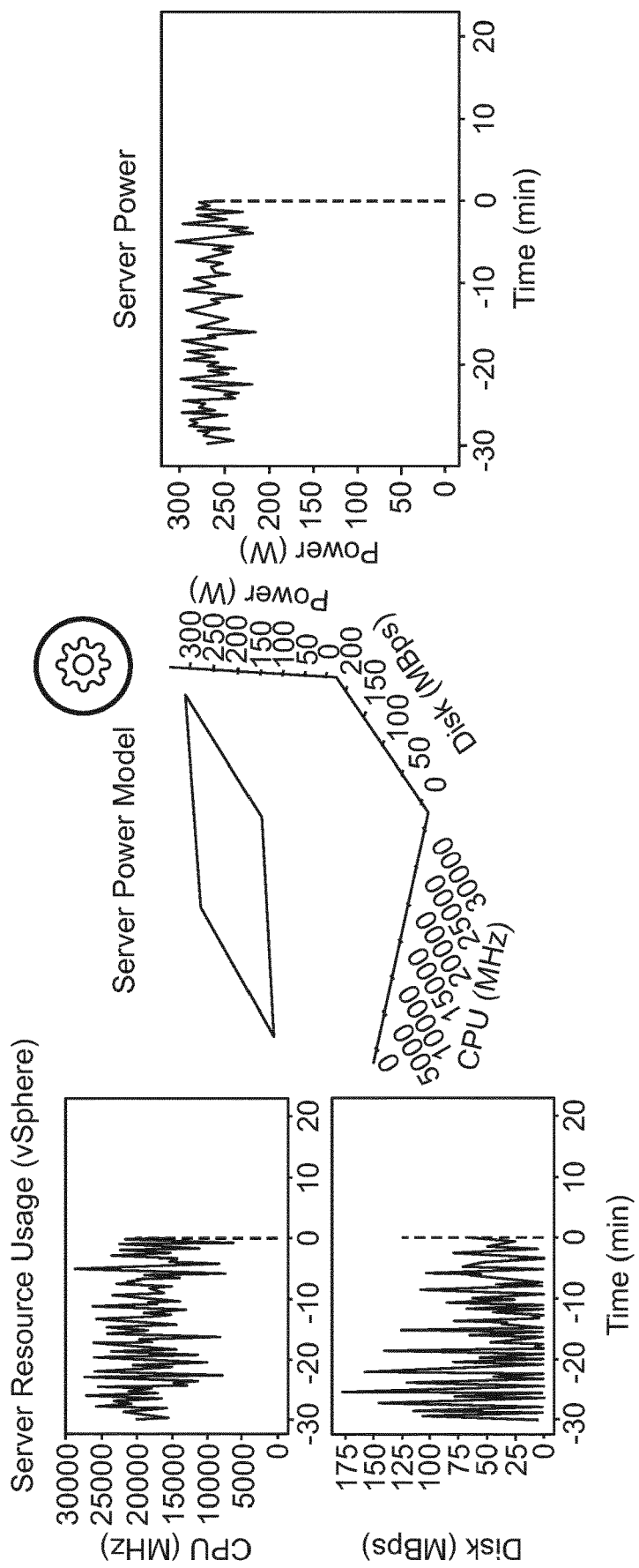
FIG. 7 shows an example of a server power model.

For the prediction model, a UPS battery autonomy model can be generated from the UPS output power monitoring, as shown in FIG. 6. A server power model can be generated based on the server resource usage (CPU clocking in MHz, disk usage in MBps), as shown in FIG. 7. These unitary models can be used for building a more global prediction model to predict the autonomy gain of the UPS as output with IT actions and the UPS output power and battery capacity as inputs.

The server power model for each server can be for example defined by the following simple equation:

$$P_{server} = P_{idle} + \theta_1 \cdot CPU_{server} + \theta_2 \cdot Disk_{server}$$

More complex server models and/or more accurate server models can also be used (e.g. neural network models).

Figure 8:
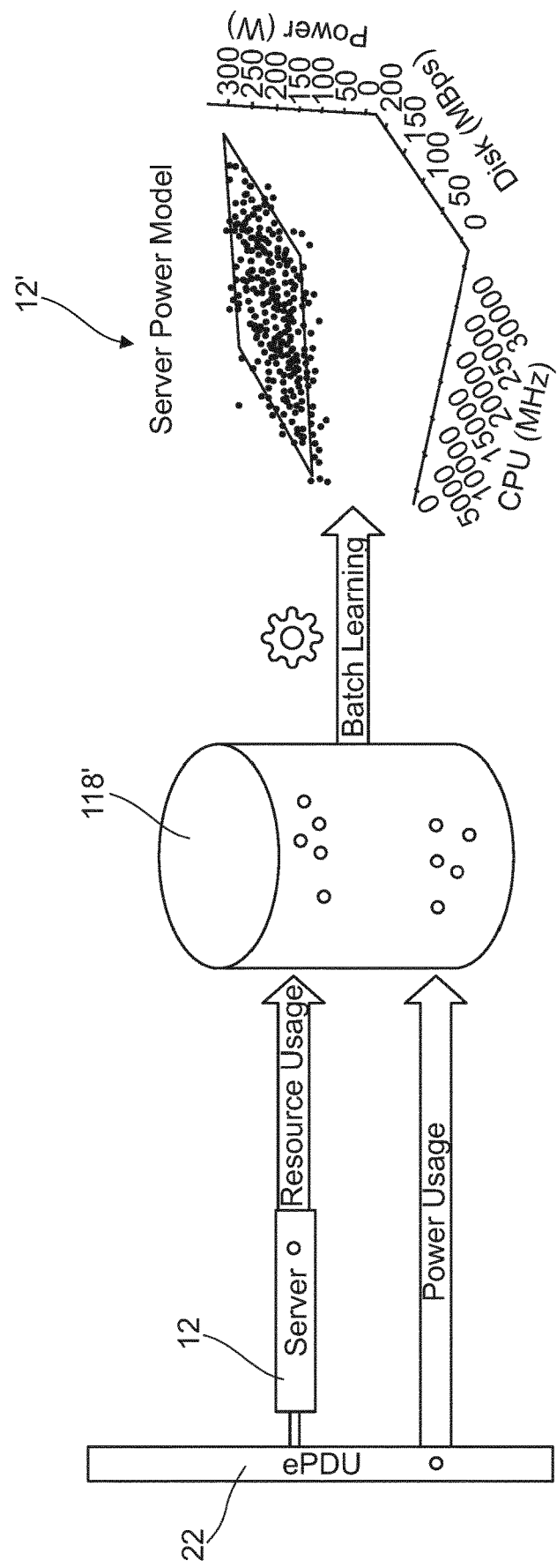
FIG. 8 shows an example of batch machine learning for generating a server power model.

One approach to find out a server's power model can comprise a classical, batch machine learning, as shown in FIG. 8. The resource usage of the server 12 and the power usage from the ePDU 22 are supplied to a machine learning algorithm 118', which performs a batch machine learning to generate the server power model 12'.

Figure 9A:
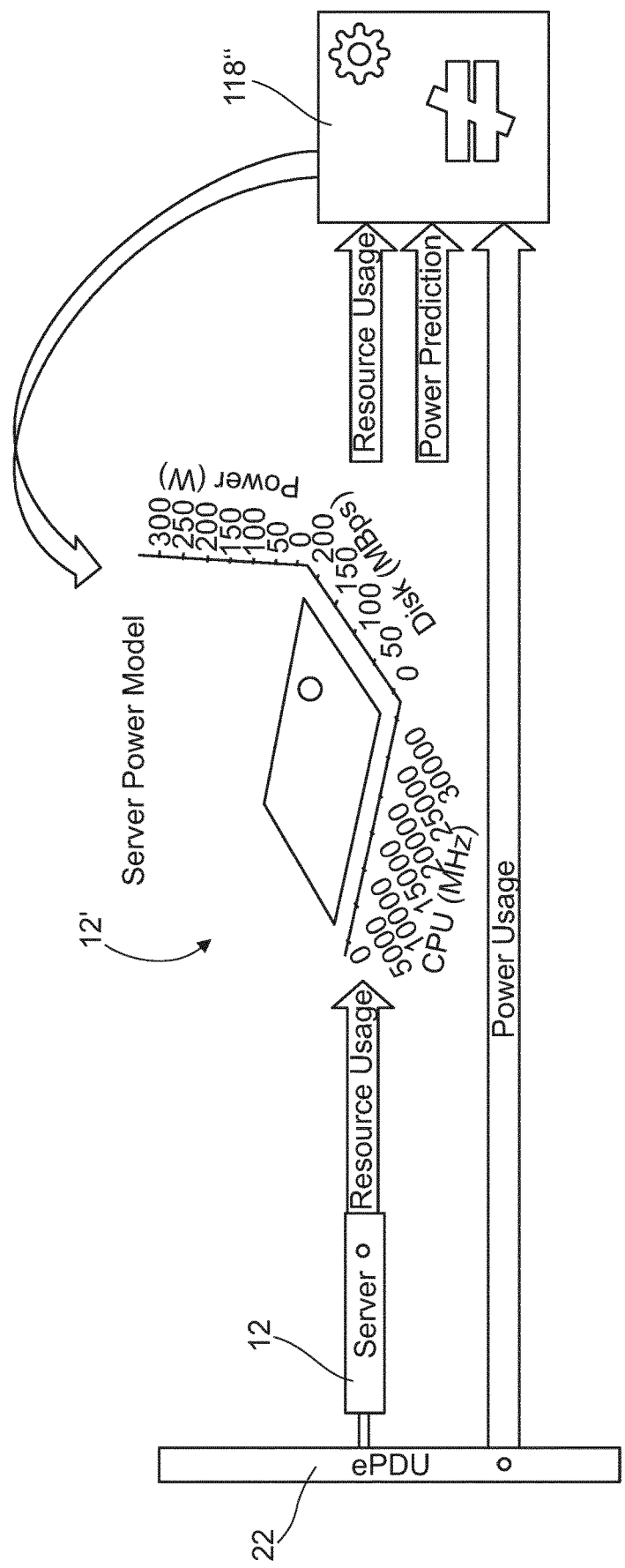
FIGS. 9A and 9B show an example of online machine learning for generating a server power model.
Figure 9B:
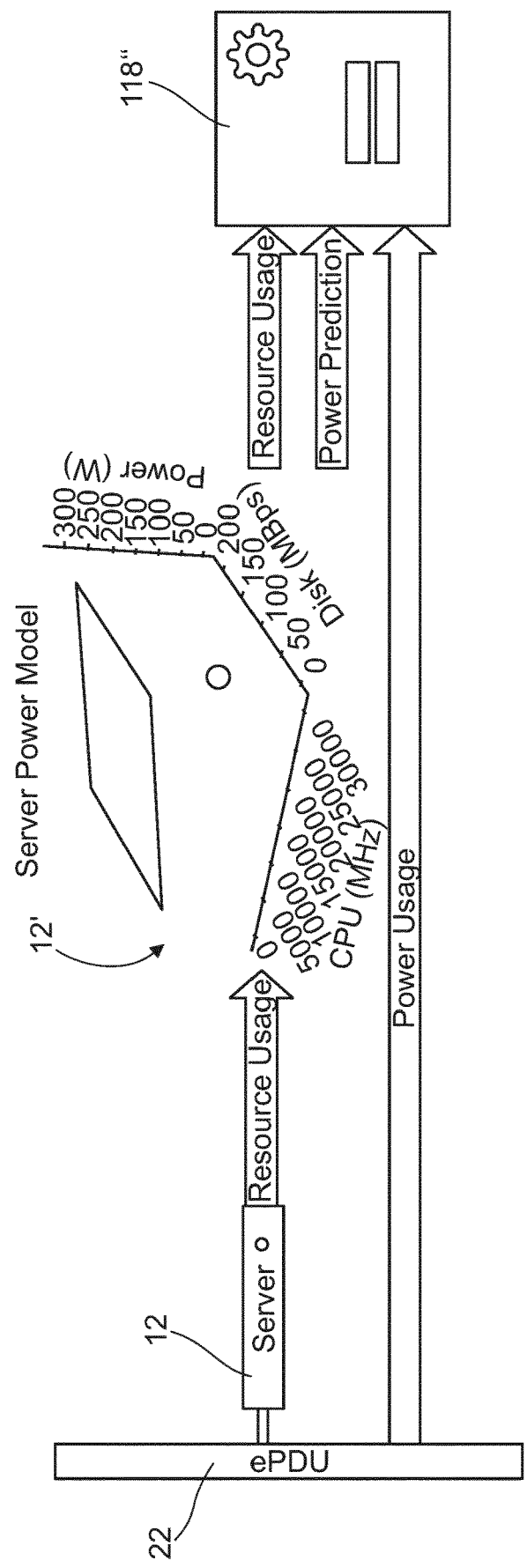

Another approach to find out a server's power model can be online machine learning, as shown in FIG. 9. The resource usage of the server 12 is supplied to the server power model 12', which processes the received data to generate a power prediction, which is forward to an online machine learning algorithm 118". The online machine learning algorithm 118" adapts the server power model 12' according to the learning and as long as there is a mismatch between the output data received from the server power model 12' and the real power usage data received from the ePDU 22, refer to FIG. 9A. When there is no longer any mismatch, then the adapation of the server power model 12' is finished, refer to FIG. 9B.

In the following, the batch and online machine learnings cons & pros are compared:

| Online machine learning | Batch machine learning |
| --- | --- |
| Low/no data storage (Learn & drop) | Storage needed for the dataset |
| Dynamic model, adapts to long term changes: temperature/humidity variations, hardware aging/wear out | Static model: unless a new dataset is built to update the model |
| Model available immediately | No model available until the dataset is ready |
| Requires stable data stream to learn over time (resource usage vs power consumption) | Learn on the provided dataset in a single step/phase |
| Low control on the data may result in low quality of the model: learn on data as it comes, data may possibly be biased | Control the quality of the model: through the quality of the dataset |

The invention claimed is:
1. A method for power management of a computing system, which comprises two or more physical servers for hosting virtual machines of a virtual system and one or more uninterruptible power supplies for supplying at least a subset of the physical servers with power, each of the one or more uninterruptible power supplies being connected to a phase of a multiple phase power supply, the method comprising:

receiving an action input for the computing system, which may impact the power consumption of the physical servers;

processing the received action input with a predictive model of power consumption of the physical servers regarding a battery autonomy of the one or more uninterruptible power supplies and a load balancing of several phases of the multiple phase power supply; and optimizing utilization of the physical servers based on the result of the processing.

2. The method of claim 1, comprising:

receiving measurements related to an operation of the physical servers;

using an artificial intelligence or machine learning algorithm for learning the power consumption of one or more individual parts of the computing system depending on actions and the measurements; and generating and/or improving the predictive model of power consumption of the physical servers based on an output of the machine learning algorithm and the measurements.

3. The method of claim 2, wherein the measurements related to the operation of the physical servers comprises at least one of the following:

total power consumption of the computing system;
temperature of an environment of the computing system;
virtual machines activity;
power consumption of physical servers;
processor activity of physical servers; and
mapping of virtual machines on the physical servers.

4. The method of claim 2, wherein the machine learning algorithm receives a training data set based on the received measurements and a validation data set based on the received measurements and processes the training data set and the validation data set to generate the predictive model.

5. The method of claim 1, wherein the optimizing of the utilization of the physical servers based on the result of the processing comprises:

receiving optimization constraints and optimization actions of the computing system;

determining one or more actions from the optimization actions for fulfilling the optimization constraints; and using the determined one or more actions for the power management of the computing system.

6. The method of claim 5, wherein the determining of one or more actions from the optimization actions for fulfilling the optimization constraints comprises determining a sequence of shutdown actions and/or shifting actions of virtual machines and/or physical servers depending on a remaining battery autonomy of the one or more uninterruptible power supplies and depending on the load balancing of the several phases of the multiple phase power supply.

7. A non-transitory computer-readable storage device storing software comprising instructions executable by a processor of a computing device which, upon such execution, cause the computing device to perform the method of claim 1.

8. A system for power management of a computing system, which comprises two or more physical servers for hosting virtual machines of a virtual system and one or more uninterruptible power supplies for supplying at least a subset of the physical servers with power, each of the one or more uninterruptible power supplies being connected to a phase of a multiple phase power supply, the power management system comprising:

a predictive model of power consumption of the physical servers, the predictive model being provided to receive an action input for the computing system, which may impact the power consumption of the physical servers, and to process the received action input with regard to a battery autonomy of the one or more uninterruptible power supplies and a load balancing of several phases of the multiple phase power supply; and an optimizer being provided for optimizing utilization of the physical servers based on the result of the processing by the predictive model.

9. The system of claim 8, wherein the optimizer is provided to:

receive optimization constraints and optimization actions of the computing system;

determine one or more actions from the optimization actions for fulfilling the optimization constraints; and use the determined one or more actions for the power management of the computing system.

10. The system of claim 9, wherein the optimizer is provided to determine one or more actions from the optimization actions for fulfilling the optimization constraints by determining a sequence of shutdown actions of virtual machines and/or physical servers depending on a remaining battery autonomy of the one or more uninterruptible power supplies and depending on the load balancing of the several phases of the multiple phase power supply.

* * * * *